F. S. DUNHAM & J. W. GREENOUGH.
TRUCK BOLSTER.
APPLICATION FILED JAN. 20, 1912.
1,042,207.
Patented Oct. 22, 1912.
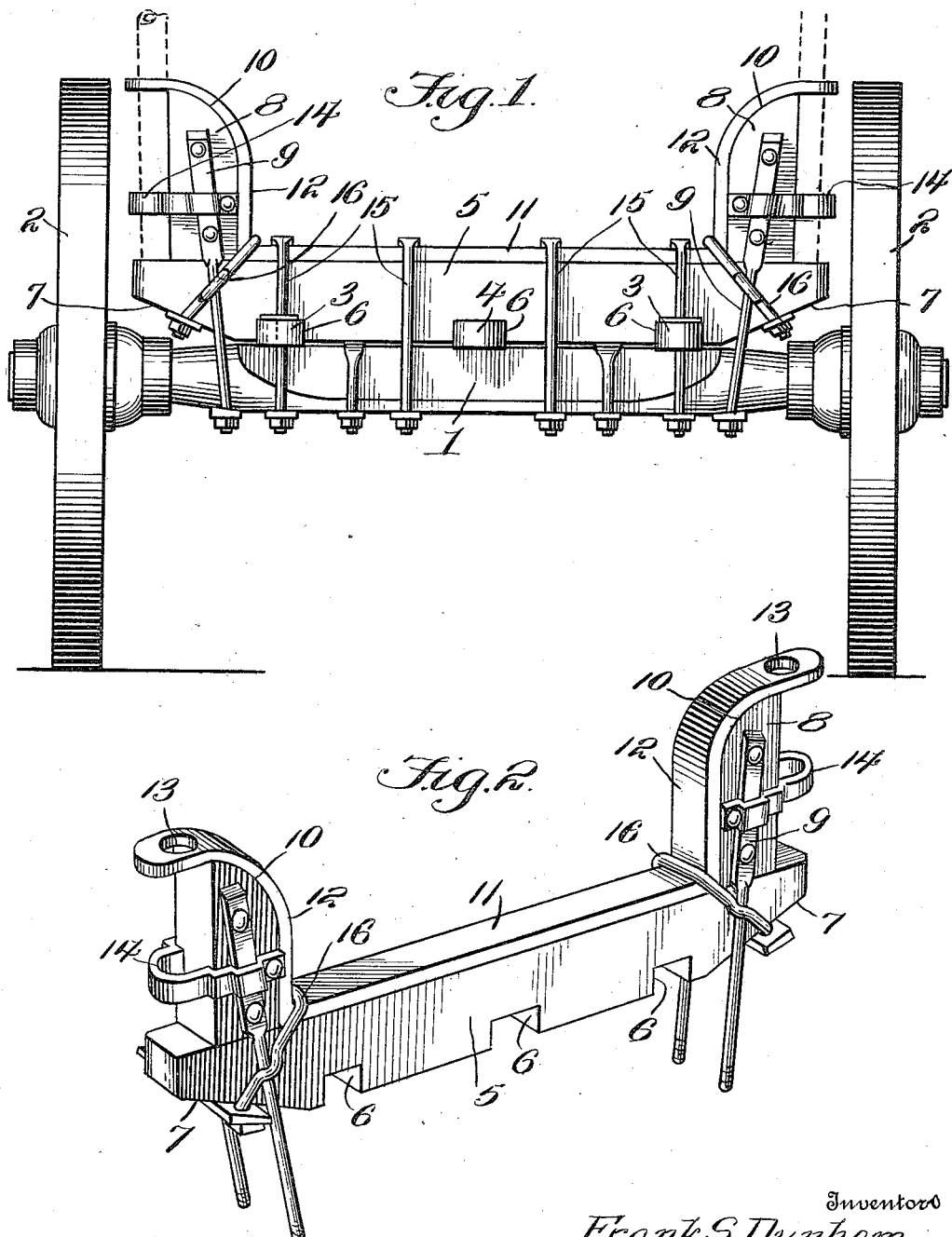
Witnesses
J. L. Wright
John J. McCarthy
Inventors
Frank S. Dunham,
John W. Greenough,
By Victor J. Evans
Attorney

UNITED STATES PATENT OFFICE.

FRANK S. DUNHAM AND JOHN W. GREENOUGH, OF RED LODGE, MONTANA.

TRUCK-BOLSTER.

1,042,207.  Specification of Letters Patent.  Patented Oct. 22, 1912.

Application filed January 20, 1912. Serial No. 672,301.

*To all whom it may concern:*

Be it known that we, FRANK S. DUNHAM and JOHN W. GREENOUGH, citizens of the United States of America, residing at Red Lodge, in the county of Carbon and State of Montana, have invented new and useful Improvements in Truck-Bolsters, of which the following is a specification.

The present invention relates to improvements in bolsters for vehicles and has particular application to bolsters for timber trucks.

In carrying out the present invention, it is our purpose to provide a bolster which is adaptable for use in conjunction with timber trucks and capable of withstanding rough usage, incident to timber hauling in mountainous regions, with a minimum amount of wear on the parts. Furthermore, we aim to provide a bolster which may be clamped upon the truck axle and reinforced in such a manner as to reduce the wear on the parts to a minimum.

With the above and other objects in view which shall appear as the description progresses, the invention consists in the construction, combination and arrangement of parts hereinafter set forth in and falling within the scope of the appended claims.

In the drawings forming a part of this specification; Figure 1 is a rear elevation of a truck axle equipped with our improved bolster, and Fig. 2 is a perspective view of a bolster, the same being removed from the axle.

Referring to the drawing in detail, the rear axle of the timber truck is indicated at 1 and is provided with the usual ground wheels 2, 2, the upper surface of the axle intermediate the wheels receiving the usual hounds 3 and the main beam 4 of the truck.

Positioned upon the rear axle is our improved bolster consisting of a main body 5 having its under surface cut-out as at 6 to receive the hounds and main beam 3 and 4 respectively in order to permit the main body of the bolster to snugly engage the upper surface of the axle. This main body, as usual, is arranged longitudinally of the axle, and has the under surfaces of its opposite ends inclined in an upward direction as at 7, 7 to permit of the free rotation of the ground wheels 2 of the truck. Projecting upwardly from the upper surface of the main body 5 of the bolster and arranged adjacent the ends thereof, are blocks or bunks 8, 8 of a width corresponding to the similar dimension of the main body and rigidly secured thereto through the medium of strap irons 9, 9 which latter are passed around the axle and serve to hold the blocks 8 fast upon the main body and properly position the body upon the axle. The relatively inner side of each block 8 is preferably curved as at 10, the purpose of which will presently appear.

Rigidly secured to the upper surface of the main body 5 of the bolster is a reinforcing and wear iron 11, which, in the present instance, is of substantially U-shape and has its upwardly projecting limbs 12 curved outwardly and in relatively opposite directions to conform to the contour of the curved sides 10 of the blocks 8, the free ends of the limbs 12 being projected outwardly beyond the blocks and having their extremities provided with openings 13. These openings are arranged in alinement with clips 14 carried by the blocks or bunks 8 so as to permit the application of stakes to the bolster in the event of it being desirable to increase the timber-carrying capacity of the truck, as will be readily understood. The interconnecting member of the wear iron 11 snugly engages the upper surface of the main body 5 of the bolster and is secured thereto through the medium of clips 15 which embrace the axle 1 and coöperate with the strap irons 9 to secure the bolster, as a whole, to the vehicle axle.

From this construction it will be seen that the wear iron not only serves to prolong the life of the bolster but also reinforces the latter and reduces the wear on the parts to a minimum, especially in rocky or mountainous regions in which timber is usually found. At the juncture of the limbs 12 with the connecting bar of the wear iron, the latter is embraced by clips 16 arranged at an angle to the clips 15 and designed to engage the inclined portion 7 of the main body whereby the position of the wear iron is doubly secured.

From the foregoing description, taken in connection with the accompanying drawing, the advantages of the construction and of the method of operation will be readily apparent to those skilled in the art to which the invention appertains, and while we have described the principles of construction of the invention, together with the device which we now consider to be the best embodiment thereof, we desire to have it understood that the device shown is merely illustrative, and that such changes may be made when desired as are within the scope of the claims appended hereto.

Having thus described our invention, what we claim and desire to secure by Letters-Patent is:

1. In a timber truck, the combination with a truck axle, of a bolster adapted to be secured to said axle, said bolster including a main body, blocks secured adjacent the opposite ends of said body and projecting upwardly therefrom, a wear iron rigidly secured to the main body, said wear iron including upwardly projecting limbs adapted to snugly engage said blocks and projecting outwardly thereof and provided with openings, and clips carried by said blocks and arranged in alinement with the openings in the said limbs, whereby to receive a stake when it is desired to increase the carrying capacity of the truck.

2. A bolster comprising a main body, a block secured to said main body adjacent each end thereof and projecting upwardly therefrom, a wear iron of substantially U-shape rigidly secured to said main body and having the limbs thereof projecting upwardly in engagement with said blocks and extended beyond the same and formed with apertures or openings in the free ends thereof, and clips carried by said blocks and arranged in alinement with the openings in said limbs to receive a stake.

In testimony whereof we affix our signatures in presence of two witnesses.

FRANK S. DUNHAM.
JOHN W. GREENOUGH.

Witnesses:
A. C. SPENCER,
I. L. KURIGAN.